US010501383B2

United States Patent
Gabrielson et al.

(10) Patent No.: US 10,501,383 B2
(45) Date of Patent: Dec. 10, 2019

(54) NITRIFICATION INHIBITOR COMPOSITIONS AND METHODS OF MAKING THEREOF

(71) Applicant: Koch Agronomic Services, LLC, Wichita, KS (US)

(72) Inventors: Kurt Gabrielson, Decatur, GA (US); Stacey Wertz, Decatur, GA (US); Drew Bobeck, Decatur, GA (US); Allen Sutton, Decatur, GA (US)

(73) Assignee: Koch Agronomic Services, LLC, Wichita, KS (US)

( * ) Notice: Subject to any disclaimer, the term of this patent is extended or adjusted under 35 U.S.C. 154(b) by 147 days.

(21) Appl. No.: 15/521,752

(22) PCT Filed: Nov. 2, 2015

(86) PCT No.: PCT/US2015/058632
§ 371 (c)(1),
(2) Date: Apr. 25, 2017

(87) PCT Pub. No.: WO2016/070184
PCT Pub. Date: May 6, 2016

(65) Prior Publication Data
US 2017/0253535 A1    Sep. 7, 2017

Related U.S. Application Data

(60) Provisional application No. 62/073,843, filed on Oct. 31, 2014.

(51) Int. Cl.
*C05G 3/08* (2006.01)
*C05C 9/00* (2006.01)
*C05C 9/02* (2006.01)
*C05G 3/00* (2006.01)

(52) U.S. Cl.
CPC .......... *C05G 3/08* (2013.01); *C05C 9/005* (2013.01); *C05C 9/02* (2013.01); *C05G 3/0005* (2013.01); *Y02P 60/218* (2015.11)

(58) Field of Classification Search
CPC ........ C05G 3/08; C05G 3/0076; C09K 15/20; C05C 3/00; C05C 9/02; C05C 9/00; Y02P 60/218
See application file for complete search history.

(56) References Cited

U.S. PATENT DOCUMENTS

| 3,112,343 A | 11/1963 | Allgeuer et al. |
| 3,231,363 A | 1/1966 | Victor |
| 3,248,255 A | 4/1966 | Belasco et al. |
| 3,477,842 A | 11/1969 | Cook et al. |
| 3,516,941 A | 6/1970 | Matson |
| 3,677,736 A | 7/1972 | Formaini |
| 3,931,063 A | 1/1976 | Renner |
| 3,953,421 A | 4/1976 | Berstein |
| 3,981,845 A | 9/1976 | Renner |
| 3,988,522 A | 10/1976 | Berstein |
| 4,013,594 A | 3/1977 | Froehlich et al. |
| 4,018,741 A | 4/1977 | Renner |
| 4,025,329 A | 5/1977 | Goertz |
| 4,033,745 A | 7/1977 | Moore |
| 4,101,521 A | 7/1978 | Renner |
| 4,115,100 A | 9/1978 | Schurter et al. |
| 4,160,782 A | 7/1979 | Van Hijfte et al. |
| 4,219,348 A | 8/1980 | Parham, Jr. et al. |
| 4,219,589 A | 8/1980 | Niks et al. |
| 4,283,423 A | 8/1981 | Watkins et al. |
| 4,367,171 A | 1/1983 | Leifels et al. |
| 4,378,435 A | 3/1983 | Takagi et al. |
| 4,431,213 A | 2/1984 | Hofer et al. |
| 4,517,003 A | 5/1985 | Kolc et al. |
| 4,530,714 A | 7/1985 | Kolc et al. |
| 4,540,428 A | 9/1985 | Van Der Puy et al. |
| 4,551,166 A | 11/1985 | Behnke et al. |
| 4,610,715 A | 9/1986 | Monaldi et al. |
| 4,746,349 A | 5/1988 | Becker |
| 4,804,403 A | 2/1989 | Moore |
| 5,005,771 A | 4/1991 | Pieh et al. |
| 5,022,917 A | 6/1991 | Allan |
| 5,089,041 A | 2/1992 | Thompson et al. |
| 5,188,654 A | 2/1993 | Manalastas et al. |
| 5,238,480 A | 8/1993 | Rehberg et al. |
| 5,332,584 A | 7/1994 | Scher et al. |
| 5,352,265 A | 10/1994 | Weston et al. |

(Continued)

FOREIGN PATENT DOCUMENTS

| CN | 1180685 A | 5/1998 | |
| CN | 1243112 A | 2/2000 | |
| CN | 1255473 A | 6/2000 | |
| CN | 1261067 A | 7/2000 | |
| CN | 1073975 C | 10/2001 | |
| CN | 1138729 C | 2/2004 | |
| DE | 10230593 C1 * | 8/2003 | ............... C05G 3/08 |
| DE | 10317895 A1 | 11/2004 | |
| DE | 102013012760 A1 | 10/2014 | |
| EP | 1464635 B1 | 10/2004 | |
| ES | 2264386 A1 | 12/2006 | |

(Continued)

OTHER PUBLICATIONS

Pergopak M (Hubber Engineered Material) pp. 1-2 <https://www.hubermaterials.com/userfiles/files/product-finder/spec/Pergopak%20M%20Technical%20Data%20Sheet.pdf> Apr. 2016.*
International Search Report and Written Opinion for corresponding PCT App. No. PCT/US2015/058632, dated Mar. 1, 2016.

*Primary Examiner* — Jennifer A Smith

(57) ABSTRACT

An improved nitrification inhibitor composition comprising UFP particles and a nitrification inhibitor, and optionally other components, is used as an additive for liquid and solid fertilizers, typically containing urea. The nitrification inhibitor particularly can be nitrapyrin and/or DMPP. Methods of making the compositions and their use are also disclosed.

23 Claims, No Drawings

(56) References Cited

U.S. PATENT DOCUMENTS

| | | |
|---|---|---|
| 5,364,438 A | 11/1994 | Weston et al. |
| 5,425,952 A | 6/1995 | Winston |
| 5,454,850 A | 10/1995 | Biamonte et al. |
| 5,547,486 A | 8/1996 | Detrick et al. |
| 5,599,374 A | 2/1997 | Detrick |
| 5,628,813 A | 5/1997 | Chen et al. |
| 5,698,003 A | 12/1997 | Omilinsky et al. |
| 5,968,222 A | 10/1999 | Kodali |
| 6,217,630 B1 | 4/2001 | Chanen et al. |
| 6,247,630 B1 | 6/2001 | Terry et al. |
| 6,315,807 B1 | 11/2001 | Patra et al. |
| 6,331,198 B1 | 12/2001 | Puttan et al. |
| 6,380,135 B1 | 4/2002 | Reuter et al. |
| 6,387,145 B1 | 5/2002 | Miele et al. |
| 6,656,883 B1 | 12/2003 | Vogt et al. |
| 6,890,888 B2 | 5/2005 | Pursell et al. |
| 6,936,078 B2 | 8/2005 | Bischof et al. |
| 6,936,681 B1 | 8/2005 | Wertz et al. |
| 7,776,124 B2 | 8/2010 | Binder et al. |
| 7,811,352 B2 | 10/2010 | Binder et al. |
| 8,048,189 B2 | 11/2011 | Whitehurst et al. |
| 8,075,659 B2 | 12/2011 | Wissemeier et al. |
| 8,088,950 B2 | 1/2012 | Bock et al. |
| 8,133,294 B2 | 3/2012 | Whitehurst et al. |
| 8,163,058 B2 | 4/2012 | Whitehurst et al. |
| 8,375,629 B2 | 2/2013 | Prasad |
| 8,399,020 B2 | 3/2013 | Driessen et al. |
| 8,419,819 B2 | 4/2013 | Sutton |
| 8,562,711 B2 | 10/2013 | Sutton et al. |
| 8,603,211 B2 | 12/2013 | Rahn et al. |
| 8,617,425 B2 | 12/2013 | Cigler |
| 8,888,886 B1 | 11/2014 | Whitehurst et al. |
| 9,034,072 B2 | 5/2015 | Gabrielson et al. |
| 9,199,884 B2 | 12/2015 | Gabrielson et al. |
| 9,212,101 B2 | 12/2015 | Gabrielson et al. |
| 9,266,789 B2 | 2/2016 | Ortiz-Suarez et al. |
| 9,394,210 B2 | 7/2016 | Gabrielson et al. |
| 9,440,890 B2 | 9/2016 | Gabrielson et al. |
| 9,732,008 B2 | 8/2017 | McKnight et al. |
| 2002/0158024 A1 | 10/2002 | Van Slyke et al. |
| 2003/0022959 A1 | 1/2003 | Blount |
| 2003/0154754 A1 | 8/2003 | Costa et al. |
| 2004/0035162 A1 | 2/2004 | Williams et al. |
| 2004/0163434 A1 | 8/2004 | Quin |
| 2005/0187123 A1 | 8/2005 | Li et al. |
| 2006/0003893 A1 | 1/2006 | Pursell et al. |
| 2006/0089259 A1 | 4/2006 | Driessen et al. |
| 2007/0157689 A1 | 7/2007 | Sutton et al. |
| 2007/0193321 A1 | 8/2007 | Phillips et al. |
| 2007/0295047 A1 | 12/2007 | Sutton |
| 2008/0070871 A1 | 3/2008 | Hucke et al. |
| 2008/0121006 A1 | 5/2008 | Prasad |
| 2008/0134737 A1 | 6/2008 | Binder et al. |
| 2008/0182946 A1 | 7/2008 | Dorr et al. |
| 2008/0221214 A1 | 9/2008 | Perveen |
| 2008/0287709 A1 | 11/2008 | Huttenloch et al. |
| 2009/0035384 A1 | 2/2009 | Lambeth et al. |
| 2010/0020631 A1 | 1/2010 | Gansmuller et al. |
| 2010/0168256 A1 | 7/2010 | Rittig et al. |
| 2010/0206029 A1 | 8/2010 | Sutton et al. |
| 2010/0206031 A1 | 8/2010 | Whitehurst et al. |
| 2010/0215611 A1 | 8/2010 | Rittig et al. |
| 2010/0218575 A1 | 9/2010 | Wissemeier et al. |
| 2011/0113842 A1 | 5/2011 | Urrutia et al. |
| 2011/0154874 A1 | 6/2011 | Rahn et al. |
| 2011/0196172 A1 | 8/2011 | Kysilka et al. |
| 2011/0233474 A1 | 9/2011 | Cigler |
| 2011/0259068 A1 | 10/2011 | Whitehurst et al. |
| 2011/0296886 A1 | 12/2011 | Gabrielson et al. |
| 2012/0096912 A1 | 4/2012 | Rizzo |
| 2012/0156275 A1 | 6/2012 | Lambeth et al. |
| 2013/0023417 A1 | 1/2013 | Sutton et al. |
| 2013/0145806 A1 | 6/2013 | Iannotta et al. |
| 2013/0152649 A1 | 6/2013 | Kweeder et al. |
| 2013/0174623 A1 | 7/2013 | Gabrielson |
| 2013/0276494 A1 | 10/2013 | Sutton |
| 2013/0276495 A1 | 10/2013 | Sutton et al. |
| 2013/0283873 A1 | 10/2013 | Sutton et al. |
| 2014/0047881 A1 | 2/2014 | Roberts |
| 2014/0047882 A1 | 2/2014 | Gabrielson et al. |
| 2014/0047883 A1 | 2/2014 | Gabrielson et al. |
| 2014/0047884 A1 | 2/2014 | Gabrielson et al. |
| 2014/0060132 A1 | 3/2014 | Roberts |
| 2014/0090432 A1 | 4/2014 | McKnight et al. |
| 2014/0174140 A1 | 6/2014 | Ortiz-Suarez et al. |
| 2014/0326030 A1 | 11/2014 | Phillip et al. |
| 2014/0360239 A1 | 12/2014 | Kleine-Kleffmann et al. |
| 2015/0031786 A1 | 1/2015 | Lambeth |
| 2015/0052960 A1 | 2/2015 | Makin et al. |
| 2015/0101379 A1 | 4/2015 | Gabrielson et al. |
| 2015/0148231 A1 | 5/2015 | Nave et al. |
| 2015/0203413 A1 | 7/2015 | Gabrielson et al. |
| 2017/0158575 A1 | 6/2017 | Schneider et al. |

FOREIGN PATENT DOCUMENTS

| | | |
|---|---|---|
| FR | 2065474 A1 | 7/1971 |
| GB | 897067 A | 5/1962 |
| WO | WO9217422 A1 | 10/1992 |
| WO | WO9518081 A1 | 7/1995 |
| WO | WO0172665 A1 | 10/2001 |
| WO | WO0179349 A1 | 10/2001 |
| WO | WO2008000196 A1 | 1/2008 |
| WO | WO2009051496 A1 | 4/2009 |
| WO | WO2009142512 A1 | 11/2009 |
| WO | WO2011009572 A1 | 1/2011 |
| WO | WO2013035106 A1 | 3/2013 |
| WO | WO2014096372 A2 | 6/2014 |

* cited by examiner

NITRIFICATION INHIBITOR COMPOSITIONS AND METHODS OF MAKING THEREOF

CROSS-REFERENCE TO RELATED APPLICATIONS

This is a 371 application of PCT/US15/58632 filed Nov. 2, 2015, which claims priority to U.S. Provisional Patent Application No. 62/073,843 filed Oct. 31, 2014, the disclosure of which is incorporated herein by reference in its entirety.

BACKGROUND

Fertilizers have been used for some time to provide nitrogen to the soil. Commercial fertilizers can come in a variety of liquid or solid forms. The most widely used and agriculturally important liquid form of nitrogen fertilizer is urea ammonium nitrate (UAN), and the most widely used and agriculturally important solid form is granular urea, a white crystalline solid under normal conditions. Urea is a commonly used nitrogen fertilizer due to its relatively low cost and its high nitrogen concentration (46%). Solid forms of urea include granular, prilled, pelletized, powdered or dust. Normally, the granular form is somewhat larger in particle size than the prills. Most of the urea-based fertilizer currently used is produced in its granular form.

After urea is applied to soil, it is hydrolyzed to yield ammonia and carbon dioxide. This process is catalyzed by the enzyme urease, which is an extracellular enzyme in the soil. The gaseous products formed by the hydrolysis reaction (ammonia and carbon dioxide) volatilize to the atmosphere, and thus, substantial losses from the total amount of the nitrogen applied to the field occur. Accordingly, some solid, water-soluble fertilizers can be made slow-release by various additives. For example, the hydrolysis process can be considerably decelerated by applying enzyme inhibitors, specifically urease or nitrification inhibitors with urea. Examples of urease inhibitors are the thiophosphoric triamide compounds disclosed in the U.S. Pat. No. 4,530,714, including N-(n-butyl)thiophosphoric triamide (NBPT). NBPT is used in a number of agricultural products, such as AGROTAIN® and AGROTAIN® ULTRA (see, e.g., U.S. Pat. No. 5,698,003); SUPER N® (see, e.g., U.S. Pat. No. 5,364,438); and SUPER U®, UFLEXX® and UMAXX® (see, e.g., U.S. Pat. No. 5,352,265).

Examples of nitrification inhibitors include, but are not limited to, dicyandiamide (DCD), nitrapyrin and 3,4-dimethylpyrazole phosphate (DMPP). DCD can be a difficult material to handle as it has poor solubility in most solvents. Accordingly, there remains a need for new compositions and methods of improving the properties of urea-based fertilizers coated with nitrification inhibitors. The present invention as described herein addresses this and other needs by providing a formulation of DMPP, nitrapyrin, or other nitrification inhibitors with a urea-formaldehyde polymer (e.g., as disclosed in U.S. Pat. No. 6,936,681). The formulation of the present invention significantly lowers the use rates of nitrification inhibitors in agricultural applications.

BRIEF SUMMARY OF THE INVENTION

The present invention relates to compositions comprising a nitrification inhibitor and UFP particles (or other carrier). In some embodiments, the UFP particles (or other carrier) can be substantially spherical particles. In one or more embodiments, the nitrification inhibitor can be one or a combination of nitrapyrin and DMPP. For example, compositions described herein can comprise about 30% by weight to about 95% by weight of a nitrification inhibitor and about 5% by weight to about 70% by weight of UFP particles, based on the total weight of the composition. The present invention also relates to methods of making the compositions and their use in agricultural applications.

In one or more embodiments, the present invention can provide compositions comprising: a nitrification inhibitor selected from the group consisting of 2-chloro-6-trichloromethylpyridine (nitrapyrin), 3,4-dimethylpyrazole phosphate (DMPP), 3-methylpyrazole (MP); 1-H-1,2,4-triazole (TZ); 3-methylpyrazole-1-carboxamide (CMP); 4-amino-1,2,4-triazole (AT, ATC); 3-amino-1,2,4-triazole; 2-cyanimino-4-hydroxy-6-methylpyrimidine (CP); 2-ethylpyridine; ammonium thiosulfate (ATS); sodium thiosulfate (ST); thiophosphoryl triamide; thiourea (TU); guanylthiourea (GTU); ammonium polycarboxilate; ethylene urea; hydroquinone; phenylacetylene; phenylphosphoro diamidate; neemcake; calcium carbide; 5-ethoxy-3-trichloromethyl-1,2,4-thiadiazol (etridiazol; terraole); 2-amino-4-chloro-6-methylpyrimidine (AM); 1-mercapto-1,2,4-triazole (MT); 2-mercaptobenzothiazole (MBT); 2-sulfanilamidothiazole (ST); 5-amino-1,2,4-thiadiazole; 2,4-diamino-6-trichloromethyl-s-triazine (CL-1580); N-2,5-dichlorophenyl succinanilic acid (DCS); nitroaniline, chloroaniline, and salts thereof; and urea-formaldehyde polymer (UFP) particles. In one or more further embodiments, the compositions can be defined by one or more of the following statements, which can be combined in any number or order.

The nitrification inhibitor specifically can be dimethylpyrazole phosphate (DMPP).

The nitrification inhibitor specifically can be nitrapyrin.

The composition further can comprise a urease inhibitor, which specifically can be N-(n-butyl)thiophosphoric triamide (NBPT).

The can comprise about 15% by weight to about 40% by weight of urease inhibitor, about 15% by weight to about 50% by weight of UFP particles, and about 40% by weight to about 95% by weight of nitrification inhibitor, based on the total weight of the composition.

The further can comprise one or more components selected from the group consisting of a conditioner, a pigment, and a dye.

The composition can comprise a conditioner selected from the group consisting of mineral oil, tricalcium phosphate, sodium bicarbonate, sodium ferricyanide, potassium ferricyanide, bone phosphate, sodium silicate, silicon dioxide, calcium silicate, talcum powder, bentonite, calcium aluminum silicate, stearic acid, sodium aluminosilicate, and polyacrylate powder.

The composition can be characterized in that at least one of the following conditions is met: a majority of the UFP particles have a particle diameter in the range of about 150 µm to about 10 µm; the UFP particles have an average diameter of about 0.05 microns to about 250 microns; the UFP particles have an average diameter of about 0.1 microns to about 150 microns; at least a portion of the UFP particles have an average diameter of about 0.01 microns to about 50 microns; about 0.1% to about 50% by weight of the UFP particles have an average diameter of about 0.05 microns to about 5 microns; about 5% to about 99% by weight of the UFP particles have an average diameter of about 10 microns to about 150 microns; about 0.1% by weight to about 40% by weight of the UFP particles have an average diameter that is up to a threshold value, and about 50% by weight to about 99% by weight of the particles have an average diameter that is greater than the threshold value, said threshold value being 0.5 microns, 1 micron, 2 microns, 5 microns, or 10 microns.

The UFP particles can be substantially spherical, and particularly the substantially spherical UFP particles can be made by acidifying a aqueous methylol urea solution, wherein the aqueous methylol urea solution is made by reacting urea and formaldehyde at a urea:formaldehyde mole ratio of from 0.7:1 to 1.25:1, and wherein the aqueous methylol urea solution contains a dispersing agent, is subjected to a high shear condition during the acidifying, or both contains a dispersing agent and is subjected to a high shear condition during the acidifying, to form an aqueous dispersion of insoluble urea-formaldehyde polymer particles and drying the dispersion to recover the urea-formaldehyde polymer particles.

The composition can be made by a process comprising contacting UFP particles with a solution of said nitrification inhibitor in a solvent under conditions including elevated temperatures and sub-atmospheric pressures thereby forming said composition. In particular, the solvent can be selected from the group consisting of NMP, polyethylene glycol, THF, propylene glycol, ethylene glycol, Solketal, glycerol, glycol derivatives, ethyl acetate dibasic esters, triethanolamine, alkanolamines, methylene chloride, solvent naptha, xylenes (including o-, m-, and p-xylenes), benzene, toluene, DMSO, and other sulfoxide derivatives, dibasic ester derivatives, acetone, glycol ethers, polyalkyleneglycol ethers, benzyl alcohol, propylene carbonate, ethylene carbonate, dioxane, hexanes, heptane, and combinations thereof.

The composition can comprise about 30% by weight to about 95% by weight of the nitrification inhibitor and about 70% by weight to about 5% by weight of the UFP particles based on the total weight of the composition.

In one or more embodiments, the present invention can relate to a fertilizer. For example, the fertilizer can comprise urea and a composition as otherwise described herein. In one or more embodiments, the fertilizer can be defined by one or more of the following statements, which can be combined in any number or order.

The urea can be present in an amount of about 90% by weight to about 99% by weight, and the nitrification inhibitor can be present in an amount of about 0.02% by weight to about 0.5% by weight.

The fertilizer can be in a granule, a prill, a pellet, a pastille, or a compounded form.

The fertilizer can be a granule having a diameter of about 0.8 mm to about 4.8 mm.

In yet another embodiment, the present invention relates to compositions comprising a nitrification inhibitor and non-UFP particles. The non-UFP particles can comprise inorganic salts, including ammonium salts, grain flour, diatomaceous earth, natural clay, and elemental sulfur.

The non-UFP compositions can be made by a process comprising contacting non-UFP particles with a solution of said nitrification inhibitor in a solvent under conditions including elevated temperatures and sub-atmospheric pressures thereby forming said composition. In particular, the solvent can be selected from the group consisting of NMP, polyethylene glycol, THF, propylene glycol, ethylene glycol, Solketal, glycerol, glycol derivatives, ethyl acetate, dibasic esters, triethanolamine, alkanolamines, methylene chloride, solvent naptha, xylenes (including o-, m-, and p-xylenes), benzene, toluene, DMSO, and other sulfoxide derivatives, dibasic ester derivatives, acetone, glycol ethers, polyalkyleneglycol ethers, benzyl alcohol, propylene carbonate, ethylene carbonate, dioxane, hexanes, heptane, and combinations thereof.

The composition can comprise about 30% by weight to about 95% by weight of the nitrification inhibitor and about 70% by weight to about 5% by weight of the UFP particles based on the total weight of the composition.

In one or more of the non-UFP embodiments, the present invention can relate to a fertilizer. For example, the fertilizer can comprise urea and a non-UFP composition as otherwise described herein. In one or more embodiments, the fertilizer can be defined by one or more of the following statements, which can be combined in any number or order.

The urea can be present in an amount of about 90% by weight to about 99% by weight, and the nitrification inhibitor can be present in an amount of about 0.02% by weight to about 0.5% by weight.

The fertilizer can be in a granule, a prill, a pellet, a pastille, or a compounded form.

The fertilizer can be a granule having a diameter of about 0.8 mm to about 4.8 mm.

DETAILED DESCRIPTION OF THE INVENTION

All percentages, parts and ratios are based upon the total weight of the compositions of the present invention, unless otherwise specified. All such weights as they pertain to listed ingredients are based on the active level and, therefore, do not include solvents or by-products that may be included in commercially available materials, unless otherwise specified. The term "weight percent" may be denoted as "wt. %" herein. All molecular weights as used herein are weight average molecular weights expressed as grams/mole, unless otherwise specified.

As used herein, "substantially" is intended to indicate a range of up to about 20% of any value indicated.

The term "substantially spherical" as used herein means that the material has a morphology that includes spherical, as well as oblong, and the like and can have surface irregularities. The sphericity of a particle can be determined using image analyzer which identifies and measures a particles image in the form of a sphere, and calculates the sphericity of a particle, as $Da/Dp$ (where $Da=(4A/\pi)$; $Dp=P/\pi$; A=pixel area; P=pixel perimeter), is a value from zero to one, with one representing a sphere. For example, in some embodiments, the particle can have a sphericity of about 0.8 or more, about 0.81 or more, about 0.82 or more, about 0.83 or more, about 0.84 or more, about 0.85 or more, about 0.86 or more, about 0.87 or more, about 0.88 or more, about 0.89 or more, about 0.9 or more, about 0.91 or more, about 0.92 or more, about 0.93 or more, about 0.94 or more, about 0.95 or more, about 0.96 or more, about 0.97 or more, about 0.98 or more, or about 0.99 or more. In one or more embodiments, a nitrification inhibitor as described herein can be combined with UFP particles. In particular, the UFP particles can be substantially spherical. In one aspect, the substantially spherical UFP particles can be those disclosed in U.S. Pat. No. 6,936,681, which is incorporated in its entirety herein by reference. Non-limiting examples of urea-formaldehyde polymers suitable for use in the practice of the present include those sold under the name NITAMIN® 36S by Koch Agronomic Services, LLC.

The substantially spherical UFP particles that can be utilized in some embodiments of the present invention can be prepared by reacting, in an aqueous environment, urea and formaldehyde at a urea:formaldehyde mole ratio of about 1:1. To prepare the UFP particles, urea and formaldehyde are reacted in admixture at a mole ratio of approximately 1:1, for example at a UF mole ratio broadly in the range of $0.7:1 \leq U:F \leq 1.25:1$ or in the range of $0.83:1 \leq U:F \leq 1.1:1$. The phase "at a mole ratio of approximately 1:1" is intended to embrace these mole ratio ranges. Particularly good results have been obtained at a U:F mole ratio between 0.95:1 and 1.05:1.

In the initial step of preparing the substantially spherical UFP particles, reaction between urea and formaldehyde is conducted in a manner to produce methylol ureas. For example, reaction between the urea and formaldehyde can be promoted by maintaining the aqueous mixture initially at a moderate alkaline pH, with a pH in the range of about 7 to 9 being suitable and with a pH more usually between about 7.5 and 8.5, to promote the formation of methylol ureas. Given urea's inherent level of alkalinity, any required pH adjustment may be accomplished using either an acid or a base. The initial formation of methyol ureas generally can be conducted at a reaction temperature broadly in the range of about 70° F. to about 175° F. (about 20° C. to about 80° C.) with a reaction temperature in the range of about 90° F. to about 160° F. (about 30° C. to about 70° C.) more usually employed. The pH may be adjusted using commonly available acids and bases such as sodium hydroxide (caustic) and sulfuric acid and any material that can alter the pH is suitable for this purpose. The reaction pH also may be maintained (buffered) or adjusted by adding such alkaline compounds as triethanolamine, sodium or potassium bicarbonate, sodium or potassium carbonate, or other alkali metal hydroxides, such as potassium hydroxide and lithium hydroxide. Alternatively, the methylolation may also be done at a moderate acidic pH, such as in the pH range of 5.0 to 6.0, as will be recognized by those skilled in the art, and the present invention is not limited by the way the initial methylolation is conducted.

Following the initial formation of methylol ureas, the nascent UFP then is condensed to the point where the polymer becomes insoluble in the aqueous environment. This result can be accomplished by rapidly acidifying the methylol ureas, to a pH below about 6, usually below about 5 and usually to a pH below about 4, but above about 1. A pH in the range of 2.5 to 4.0 has proven to be suitable. Any organic or inorganic acid that will lower the pH can be used. Particularly suitable is a strong acid, such as a mineral acid or an organic acid, such as the stronger carboxylic acids. Thus, suitable acids include formic acid, acetic acid, nitric acid, phosphoric acid, sulfuric acid and hydrochloric acid. However, in its broadest aspects the present invention is not limited by the way the further polymerization of the methylol ureas and ultimate insolubilization is conducted and obtained.

In order to produce a desired range of substantially spherical UFP particle diameters, the aqueous mixture of the methylol ureas is mixed in the presence of a dispersing agent during the step of rapid polymerization that leads to insolubilization, such as the rapid acidification step, although it is possible to get a similar result by maintaining a sufficiently high level of agitation (high shear) during the reaction in the absence of any dispersing agent. The resulting dispersion of UFP formed from the polymerization that occurs, for example, following acidification, is then recovered or isolated from the dispersion to produce substantially spherical UFP particles, which then are used in any of the various applications noted herein. The substantially spherical UFP particles formed in this manner have approximately 36% by weight nitrogen when dry.

Skilled practitioners recognize that the formaldehyde and urea reactants used to make the substantially spherical UFP particles of this invention are commercially available. The formaldehyde used can be in any available form. Paraform (solid, polymerized formaldehyde) and formalin solutions (aqueous solutions of formaldehyde, sometimes with methanol, in 37 percent, 44 percent, or 50 percent formaldehyde concentrations) are commonly used sources of formaldehyde. Formaldehyde also may be available as a gas. Each of these sources of formaldehyde is suitable for use in the preparing the substantially spherical UFP particles of this invention. Generally, for ease of use, formalin solutions are used as the formaldehyde source. In addition, some of the formaldehyde may be replaced with another aldehyde that can react with urea, such as acetaldehyde and/or propylaldehyde. Glyoxal may also be used in place of formaldehyde, as may other aldehydes not specifically enumerated.

Urea also is available in many forms. Solid urea, such as prill, and urea solutions, typically aqueous solutions, are commercially available. Further, urea often is chemically combined with formaldehyde in the form of a urea-formaldehyde concentrate, such as UFC 85, or as a commercially-available solution containing about 25 weight percent urea, about 60 weight percent formaldehyde, and about 15 weight percent water, available under the trademark STA-FORM 60®. In one embodiment, the urea formaldehyde source is UFC 85. Each of these sources of urea and formaldehyde can be used in preparing the substantially spherical UFP particles of this invention.

The urea-formaldehyde condensation reaction that results in the substantially spherical UFP particles of this invention may be conducted in an aqueous environment. As noted above, the reaction is conducted until the growing urea-formaldehyde polymer becomes insoluble in the aqueous reaction medium. A dispersing agent may be included in the water to facilitate the production of small polymer particles by the reaction. One suitable dispersant is the line of DAXAD® dispersants commercially available from Hampshire Chemicals, a subsidiary of the Dow Chemical Company. One of the classes of these dispersants is a condensed naphthalene sulfonate. Both the high and low molecular weight species of this product line have been shown to be suitable, such as DAXAD 19. A variety of other dispersants or surfactants also can be used, including those that might be classified as anionic, such as polyacrylates (also available under the DAXAD® label-such as DAXAD 30 from Hampshire Chemicals). Nonionic and cationic dispersant compounds also can be used. The nature of the specific dispersant/surfactant is not critical. Another example is a lignosulfonate salt or lignin. It is also possible to dispense with the use of any dispersant, provided that the reaction medium is sufficiently agitated (high shear) during the UF condensation reaction to promote the formation of small substantially spherical UFP particles. In one embodiment, a dispersant is used with high shear agitation. In one embodiment, a dispersant is used with high shear agitation, and the use of the dispersant allows effective dispersal with a lower degree of agitation than the degree necessary for dispersal by agitation alone.

The amount of dispersant to include in the aqueous solution of methylol urea at the time of the insolubilization reaction can be readily determined by those skilled in the art. The amount depends to some extent on the particular dispersant chosen to use and the concentration of methylol urea in the aqueous reaction medium. Generally, the urea and formaldehyde reactants and the water vehicle are provided in amounts to yield a methylol urea concentration that ultimately provides a dispersion of UFP at about a 20% by weight solid concentration up to about 60% by weight solids. More usually, the materials are provided so that the UFP dispersion is about 30% to about 55% by weight solids. In one embodiment, the dispersion UFP is prepared at about a 40% by weight solids concentration. Under these conditions, the dispersing agent is generally supplied at a concentration of about 0.1% to about 5% by weight, and usually in at least about 0.5% by weight up to about 2% by weight.

In the broad practice of this invention, the aqueous dispersion of UFP is isolated to form substantially spherical UFP particles before use. According to the broadest aspects of the invention, any way for isolating the substantially spherical UFP particles from the aqueous substantially spherical UFP particles dispersion can be used. For example, the substantially spherical UFP particles in the dispersion may be isolated by filtration and oven drying, or by thin film evaporation. When using these latter techniques, it may then be necessary to reduce the particle diameter of the recovered solids, for example by grinding, to obtain a desired particle diameter or diameter distribution for a specific application.

In one embodiment, the way of isolating or recovering the substantially spherical UFP particles from the dispersion formed by the polymerization of urea and formaldehyde as described above, is by spray-drying. As used herein, the terms "spray dryer" and "spray drying" refer to the technically sophisticated process of atomizing (in the form of finely divided droplets) the UFP dispersion or slurry into a gas stream (often a heated air stream) under controlled temperature conditions and under specific gas/liquid contacting conditions to effect evaporation of water from the atomized droplets and production of a dry particulate solid product. Spray drying as used herein is typically carried out with pressure nozzles (nozzle atomization) or centrifugal atomizers operating at high speeds (e.g., a spinning disc). Despite the high-velocity generation of droplets, a spray dryer is designed so that the droplets do not contact the spray dryer wall under proper operating procedures. This effect is achieved by a precise balance of atomizer velocity, air flow, spray dryer dimensions of height and diameter, and inlet and outlet means to produce a cyclonic flow of gas, e.g., air in the chamber. A pulse atomizer also can be used to produce the small droplets needed to facilitate evaporation of the water. In some cases, it may be desirable to include a flow promoter, such as an aluminosilicate material, in the aqueous dispersion that is processed in a spray dryer simply to facilitate subsequent handling and transport of the spray dried substantially spherical UFP particles (e.g., to avoid clumping).

The shape and size of the substantially spherical UFP particles can be significantly consistent. Producing substantially spherical UFP particles of a consistent size helps adhere the desired amount of active as well as other components subsequent formulations. By using the method of making the substantially spherical UFP particles in the presence of a dispersant, it is easy to produce most of the substantially spherical UFP particles of a consistent size so as to pass through a 100 mesh (U.S. or Tyler) screen, and generally at least a major portion pass through a 200 mesh screen. Thus, the majority of the substantially spherical UFP particles will have a diameter larger than about 0.15 micrometers.

Particle sizes described herein can relate specifically to substantially spherical UFP particles in some embodiments. In one or more embodiments, however, the particle sizes can relate to UFP particles that are not necessarily substantially spherical and/or can relate to other carrier particles.

In some embodiments, the UFP particles used herein can have an average diameter of about 0.05 microns to about 250 microns, about 0.1 microns to about 150 microns, or about 0.2 microns to about 100 microns. Preferably, about 50% or greater, about 75% or greater, about 80% or greater, about 85% or greater, about 90% or greater, about 95% or greater, about 98% or greater, or about 99% or greater by weight of the particles will have an average diameter falling within one or more of the above ranges, said weight being relative to the total weight of the particles. If desired, particles falling within two or more different size ranges can be used.

In some embodiments, at least a portion of the particles can have an average diameter in a first size range. For example, a lower size range can be about 0.01 microns to about 50 microns, about 0.02 microns to about 25 microns, about 0.03 microns to about 20 microns, about 0.04 microns to about 10 microns, about 0.05 microns to about 5 microns, about 0.07 microns to about 2 microns, or about 0.1 microns to about 1 microns. In particular about 0.1% to about 50%, about 0.2% to about 30%, about 0.5% to about 25%, about 1% to about 20%, or about 2% to about 15% by weight of the particles will have an average diameter falling within one or more of the above ranges, said weight being relative to the total weight of the particles.

In some embodiments, at least a portion of the particles can have an average diameter in a second size range. For example, a second size range can be about 5 microns to about 250 microns, about 10 microns to about 150 microns, or about 10 microns to about 100 microns. In particular, about 5% to about 99%, about 10% to about 95%, about 15% to about 90%, or about 20% to about 85% by weight of the particles will have an average diameter falling within one or more of the above ranges, said weight being relative to the total weight of the particles.

In some embodiments, at least a portion of the particles can have an average diameter that is up to a threshold value, and at least a portion of the particles can have an average diameter that is greater than the threshold value. The threshold value can be 0.5 microns, 1 micron, 2 microns, 5 microns, or 10 microns. About 0.1% to about 40%, about 0.5% to about 30%, about 1% to about 20%, about 2% to about 15%, or about 5% to about 10% by weight of the particles can have an average diameter that is up to the threshold value, said weight being relative to the total weight of the particles. About 50% to about 99%, about 60% to about 99%, about 70% to about 99%, about 80% to about 99%, about 85% to about 99%, or about 90% to about 99% by weight of the particles can have an average diameter that is greater than the threshold value, said weight being relative to the total weight of the particles.

The term "majority" as used herein means the greater number or part; a number more than half the total. For example, in some embodiments, majority can mean about 51% or more, about 52% or more, about 53% or more, about 54% or more, about 55% or more, about 56% or more, about 57% or more, about 58% or more, about 59% or more, about 60% or more, about 61% or more, about 62% or more, about 63% or more, about 64% or more, about 65% or more, about 66% or more, about 67% or more, about 68% or more, about 69% or more, about 70% or more, about 71% or more, about 72% or more, about 73% or more, about 74% or more, about 75% or more, about 76% or more, about 77% or more, about 78% or more, about 79% or more, about 80% or more, about 81% or more, about 82% or more, about 83% or more, about 84% or more, about 85% or more, about 86% or more, about 87% or more, about 88% or more, about 89% or more, about 90% or more, about 91% or more, about 92% or more, about 93% or more, about 94% or more, about 95% or more, about 96% or more, about 97% or more, about 98% or more, or about 99% or more.

In one or more embodiments, the isolated, substantially spherical UFP particles that are recovered from the aqueous dispersion, for example by spray-drying, then are used in combination with nitrification inhibitor(s) and in further applications. While not wishing to be bound by theory, the inventors hereof believe morphology of the substantially spherical UFP particles is directly attributable to the conditions of the above-process. Also, the inventors believe morphology of the substantially spherical UFP particles not only facilitates its coating by the nitrification inhibitor(s) but also improves the properties of further formulations. Because of its uniformity in size and shape, the composition of the substantially spherical UFP particles has significantly less dust, which avoids the need for further dust control agents that can cause undesirable properties, such as clumping in subsequent formulations. While the use of substantially spherical UFP particles thus can be preferred in some embodiments, the present invention is not necessarily limited to the use of UFP particles that are substantially spherical.

A "Nitrification inhibitor" as used herein is a compound that inhibits the conversion of ammonium to nitrate and reduces nitrogen losses in the soil. Examples of nitrification inhibitors include, but are not limited to, dicyandiamide (DCD), 2-chloro-6-trichloromethylpyridine (nitrapyrin), 3,4-dimethylpyrazole phosphate (DMPP), 3-methylpyrazole (MP); 1-H-1,2,4-triazole (TZ); 3-methylpyrazole-1-carboxamide (CMP); 4-amino-1,2,4-triazole (AT, ATC); 3-amino-1,2,4-triazole; 2-cyanimino-4-hydroxy-6-methylpyrimidine (CP); 2-ethylpyridine; ammonium thiosulfate (ATS); sodium thiosulfate (ST); thiophosphoryl triamide; thiourea (TU); guanylthiourea (GTU); ammonium polycarboxilate; ethylene urea; hydroquinone; phenylacetylene; phenylphosphoro diamidate; neemcake; calcium carbide; 5-ethoxy-3-trichloromethyl-1,2,4-thiadiazol (etridiazol; terraole); 2-amino-4-chloro-6-methylpyrimidine (AM); 1-mercapto-1,2,4-triazole (MT); 2-mercaptobenzothiazole (MBT); 2-sulfanilamidothiazole (ST); 5-amino-1,2,4-thiadiazole; 2,4-diamino-6-trichloromethyl-s-triazine (CL-1580); N-2,5-dichlorophenyl succinanilic acid (DCS); nitroaniline, chloroaniline, salts thereof, and the like. The nitrification inhibitors of the present invention can have a particle size in the range of about 50 to 350 microns. The nitrification inhibitor is present in the dry flowable additive in the range of about 0.01% to about 99%, or about 40% to about 95%, or about 70% to about 90% by weight, based on the total weight of the composition. In a further embodiment of the invention, the dry flowable additive may contain about 1.0% to about 30% by weight UFP particles and about 40% to about 90% nitrification inhibitor by weight, based on the total weight of the composition.

"Urease inhibitor" as used herein is a compound that interferes with urease activity and reduces urea hydrolysis in soils. Examples of urease inhibitors include, but are not limited to, phosphoric triamides, such as N-(n-butyl)thiophosphoric triamide (NBPT) and the like. In another group of embodiments, the urease inhibitor is N-(n-butyl)thiophosphoric triamide ("NBPT"). The NBPT can be crude or pure (with less than 10% other ingredients). In some embodiments, the NBPT is purified by recrystallization. In embodiments where a urease inhibitor, such as NBPT, is included, the material may be in a crystalline form and/or in an amorphous form. In one or more embodiments, compositions according to the present disclosure may contain about 1% to about 80% by weight NBPT and about 99% to about 20% by weight of UFP particles, based on the total weight of the composition. The ratio of NBPT to DCD preferably is about 0.02 or greater, such as about 0.02 to about 10.0 or about 0.04 to about 4.0. In some embodiments, the composition comprises about 81% nitrification inhibitor, about 8% UFP, and about 11% of a NBPT/UFP mixture.

The utilization of both a urease inhibitor and a nitrification inhibitor in the fertilizer composition of this invention offers an opportunity to tailor the make-up of the composition to match the nitrogen nutrient demand of a given crop/soil/weather scenario. For example, if the soil is characterized by a low pH or if rain is anticipated shortly after fertilizer application, the opportunity for ammonia losses through volatilization to the atmosphere is thereby diminished. In such case(s), the level of the NBPT urease inhibitor incorporated into the formulation may be reduced, within the specified range, without also changing the level of the nitrification inhibitor. The relative resistance of the fluid fertilizer composition of this invention to urea hydrolysis and ammonia oxidation is controlled by properly selecting the NBPT to nitrification inhibitor weight ratio of the composition. This ratio can be about 0.01 or greater, such as about 0.02 to about 8.0 or about 0.05 to about 1.0. Fluid fertilizer compositions with NBPT to nitrification inhibitor weight ratios near the higher end of these ranges will exhibit relatively higher resistance to urea hydrolysis than to ammonium oxidation, and vice versa. This independent control over the relative resistance of the composition to urea hydrolysis and ammonia oxidation is unattainable through the methods of prior art and provides unparalleled flexibility in meeting the nutrient demands of various crops under a broad range of soil/weather conditions.

The means by which the one or more nitrification inhibitors are deposited onto the UFP particles can be selected from any method known. In one group of embodiments, the one or more nitrification inhibitors are deposited onto the UFP particles by using a blending or drying device such as a high-shear mixer, ribbon blender, blade mixer, or other similar device. While heat need not be applied during blending, in one group of embodiments, the drying device is a ribbon blender or blade blender. In other embodiments, the composition is blended in standard blending equipment without drying equipment.

Typically, one or more nitrification inhibitors are coated onto or mixed with the UFP particle by introducing into the drying or blending device the UFP particles and a solution comprising a solvent and the one or more nitrification inhibitors. Another embodiment is to blend the UFP particles with the nitrification inhibitors without solvent present. In another embodiment, nitrification inhibitor is directly sprayed onto the UFP particles while mixing. The mixture is then subsequently dried at an elevated temperature.

The amount of UFP particles used with any particular nitrification inhibitor may vary and will usually depend on the particular application, as well as the optional presence of other components besides the UFP particles used in the present invention. The composition comprising the one or more nitrification inhibitor typically contains about 30% to about 95% by weight of the nitrification inhibitor, based on the weight of the composition. In one group of embodiments, the composition comprises about 40% to about 70% by weight of the nitrification inhibitor, based on the total weight of the composition. In one group of embodiments, the composition comprises from about 50% to about 60% by weight of the nitrification inhibitor based on the total weight of the composition.

In one or more embodiments, substantially spherical UFP particles and nitrification inhibitor solution can be introduced into the drying device simultaneously, in stages, either the substantially spherical UFP particle solution introduced before the other, or any combinations thereof—i.e., either a batch or a continuous process. In one group of embodiments, the nitrification inhibitor as a solid or solution is introduced into the drying device after the substantially spherical UFP particles. In this and other embodiments, the introduction of the nitrification inhibitor as a solution is controlled to avoid over-wetting of the substantially spherical UFP particles. Over-wetting can be prevented by introducing the nitrification inhibitor solution into the drying device at a rate substantially equal to the rate at which the solvent volatilizes. The volatilization of the solvent is achieved by operating the drying device under conditions that include a temperature that is below the melting point of the nitrification inhibitor(s). In one group of embodiments, the drying device is operated under such a temperature and a sub-atmospheric pressure. In one group of embodiments, the temperatures under which the drying device is operated are in the range of about 20° C. to about 200° C., about 20° C. to about 100° C., or about 20° C. to about 50° C. Also, as stated above, the drying device may be operated under sub-atmospheric pressures, i.e. under a vacuum. These pressures may be in the range of about 760 mmHg to about 0.1 mmHg, about 500 mmHg to about 50 mmHg, or about 100 mmHg to about 50 mmHg.

Other optional components may be used in compositions of the present invention. Examples of other agents, include but are not limited to a conditioner, xanthan gum, calcium carbonate (agricultural lime) in its various forms for adding weight and/or raising the pH of acid soils; metal containing compounds and minerals such as gypsum, metal silicates and chelates of various micronutrient metals such as iron, zinc and manganese; talc; elemental sulfur; activated carbon, which may act as a "safener" to protect against potentially harmful chemicals in the soil; a plant protectant; a nutrient stabilizer, super absorbent polymers, wicking agents, wetting agents, plant stimulants to accelerate growth, an inorganic nitrogen, phosphorus, potassium (N—P—K) type fertilizer, sources of phosphorus, sources of potassium, and organic fertilizers, surfactants, initiators, stabilizers, cross linkers, antioxidants, UV stabilizers, reducing agents, dyes, such as blue dye (FD & C blue #1); pigments (i.e., a substantially water-insoluble colored compound); and plasticizers. Examples of conditioners include, but are not limited to, tricalcium phosphate, sodium bicarbonate, sodium ferricyanide, potassium ferricyanide, bone phosphate, sodium silicate, silicon dioxide, calcium silicate, talcum powder, bentonite, calcium aluminum silicate, stearic acid, and polyacrylate powder. Examples of plant protectants and nutrient stabilizers include silicon dioxide, and the like.

The content of the additional components can be from 1% to about 99% by weight of the composition. For example, the amount of the additional components in the composition can be about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98 or about 99% by weight of the total granular fertilizer composition.

The urea-based granular fertilizer of the present invention can include any suitable quantity of a urea source and one or more additional components. In one group of embodiments, the urea source is granulated solid or prilled urea. One of skill in the art will appreciate other urea sources for the inventive methods. The amount of the urea source in the urea-based granular fertilizer can range from about 1% to about 99% by weight of the total granular fertilizer composition. The amount of the urea source in the urea-based granular fertilizer can be about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98 or about 99% by weight of the total granular fertilizer composition In another group of embodiments, the present invention provides a urea-based granular fertilizer composition comprising:

a) a urea source of from about 95% to 99% by weight of the total granular fertilizer composition;

b) a composition of a nitrification inhibitor and substantially spherical UFP particles as described above in the range of from about 1% to 5% by weight of the total granular fertilizer composition.

Thus in one embodiment, the urea content of the composition of this invention is about 90% to about 99% by weight, and alternatively about 92% to about 99% by weight. The content of the nitrification inhibitor and UFP particle composition is about 0.02% to about 0.5% by weight, or about 0.04% to about 0.4% by weight. The nitrification inhibitor may account for about 0.01% to about 90% by weight of the composition, and in some embodiment's accounts for between about 0.05% and about 81% by weight of the composition. The diameter of the granules of the improved homogenous urea-based fertilizer composition of this invention ranges from about 0.5 millimeters to about 10 millimeters, and in some embodiments from about 0.8 millimeters to about 0.9, to about 1.0, to about 1.1, to about 1.2, to about 1.3, to about 1.4, to about 1.5, to about 1.6, to about 1.7, to about 1.8, to about 1.9, to about 2.0, to about 2.1, to about 2.2, to about 2.3, to about 2.4, to about 2.5, to about 2.6, to about 2.7, to about 2.8, to about 2.9, to about 3.0, to about 3.1, to about 3.2, to about 3.3, to about 3.4, to about 3.5, to about 3.6, to about 3.7, to about 3.8, to about 3.9, to about 4.0, to about 4.1, to about 4.2, to about 4.3, to about 4.4, to about 4.5, to about 4.6, to about 4.7, and to about 4.8 millimeters.

In one aspect, the present invention provides a method, wherein the contacting is selected from the group consisting of blending and mixing. The conditioner when mixed or blended with a urea-based fertilizer provides a urea-based fertilizer that has improved storage and handling properties.

The amount of the nitrification inhibitor and UFP particle compositions of the present invention added to urea in accordance with this invention depends on the desired nitrification inhibitor content of the granular fertilizer composition and can be readily calculated by those skilled in the art. In some embodiments, no or only very limited quantities of a solvent are introduced onto the urea along with the nitrification inhibitor and UFP particle composition. For example, if the nitrification inhibitor and UFP particle composition content of the concentrated nitrification inhibitor solution used to incorporate the nitrification inhibitor and UFP particle composition in the fertilizer composition is 70% and the NBPT content of the resulting fertilizer composition is 0.07%.

In some embodiments, nitrification inhibitor is added to and blended with the urea at this point in the formulation rather than during the formulation with UFP particles, alone. Several methods can be used for coating the nitrification inhibitor onto solid urea. If available as a powder or in granular form, the DCD may be incorporated into a solution of the NBPT and UFP particle composition described hereinabove and introduced onto the urea along with the nitrification inhibitor and UFP particle composition. Regardless of the method selected to introduce the nitrification inhibitor onto the urea, sufficient mixing should be provided to facilitate homogenous distribution of the nitrification inhibitor on the urea. The homogeneous distribution of the nitrification inhibitor and the UFP particle on the granular fertilizer compositions of this invention enhances the performance of these compositions in terms of their ability to promote plant growth.

The order in which the nitrification inhibitor and UFP particle composition and the urease inhibitor are added to the urea in the practice of this invention is flexible: Either the nitrification inhibitor and UFP particle composition or the urease inhibitor may be introduced first, or both of these components may be added simultaneously. In one group of embodiments, the urease inhibitor is added first to provide adequate time for both the dissolution and uniform distribution of the urease inhibitor.

After the nitrification inhibitor and UFP particle composition is combined with the urea, the granules may be sized. In one group of embodiments, granules which pass through a 4 mesh Tyler Series sieve (about 4.76 millimeters) and stay on a 20 mesh Tyler Series sieve (about 0.84 millimeters) are retained as product. The undersized particles may be recycled, the oversized particles may be ground and/or recycled.

The granular fertilizer composition of this invention made by the methods described herein can be used in all agricultural applications in which granular fertilizer compositions are currently used. These applications include a very wide range of crop and turf species, tillage systems, and fertilizer placement methods. The fertilizer granules made with the nitrification inhibitor (and/or urease inhibitor) and UFP particle composition of present invention are useful for fertilizing a wide variety of seeds and plants, including seeds used to grow crops for human consumption, for silage, or for other agricultural uses. Indeed, virtually any seed or plant can be treated in accordance with the present invention using the compositions of the present invention, such as cereals, vegetables, ornamentals, conifers, coffee, turf grasses, forages and fruits, including citrus. Plants that can be treated include grains such as barley, oats and corn, sunflower, sugar beets, rape, safflower, flax, canary grass, tomatoes, cotton seed, peanuts, soybean, wheat, rice, alfalfa, sorghum, bean, sugar cane, broccoli, cabbage and carrot.

The granular urea-based fertilizer composition of this invention can be used in all agricultural applications in which granular urea is currently used. These applications include a very wide range of crop and turf species, tillage systems, and fertilizer placement methods. Most notably, the fertilizer composition of this invention can be applied to a field crop, such as corn or wheat, in a single surface application and will nevertheless supply sufficient nitrogen to the plants throughout their growth and maturing cycles. The fertilizer composition of this invention is capable of supplying the nitrogen nutrient with greater efficiency than any previously known fertilizer composition. The composition increases the nitrogen uptake by plants, enhances crop yields, and minimizes the loss of both ammonium nitrogen and nitrate nitrogen from the soil.

The rate at which the fertilizer composition of this invention is applied to the soil may be identical to the rate at which urea is currently used for a given application, with the expectation of a higher crop yield in the case of the composition of this invention. Alternately, the composition of this invention may be applied to the soil at lower rates than is the case for urea and still provide comparable crop yields, but with a much lower potential for nitrogen loss to the environment. It is of interest to illustrate the quantities of NBPT and DCD introduced into the soil when a given composition of this invention is applied as a fertilizer. For example, assuming that the composition is applied to the soil at a rate of 100 pounds per acre and that it contains 0.1% NBPT and 1% DCD, it can be readily calculated that the rates of NBPT and DCD application are 0.1 and 1.0 pounds per acre, respectively.

The UAN-based fluid fertilizer composition of this invention can be used in all agricultural applications in which UAN is currently used. These applications include a very wide range of crop and turf species, tillage systems, and fertilizer placement methods. Alternatively, the fertilizer can be aqua ammonia, ammonium sulfate, MAP, DAP, any compounded NPK, or a urea or ammonium based fertilizer.

The UAN-based fertilizer composition of this invention can be used in all agricultural applications in which UAN is currently used. These applications include a very wide range of crop and turf species, tillage systems, and fertilizer placement methods. The fertilizer composition of this invention can be applied to a field crop, such as corn or wheat, in a single surface application and will nevertheless supply sufficient nitrogen to the plants throughout their growth and maturing cycles. Moreover, the fluid fertilizer composition of this invention supplies nitrogen nutrient to crop plants with greater efficiency than any previously known fluid fertilizer composition. The new improved composition increases the nitrogen uptake by plants, enhances crop yields, and minimizes the loss of both ammonium nitrogen and nitrate nitrogen from the soil.

The rate at which the fertilizer composition of this invention is applied to the soil may be identical to the rate at which UAN is currently used for a given application, with the expectation of a higher crop yield in the case of the composition of this invention. Alternately, the composition of this invention may be applied to the soil at lower rates than is the case for UAN and still provide comparable crop yields, but with a much lower potential for nitrogen loss to the environment. It is of interest to illustrate the quantities of NBPT and DCD introduced into the soil when a given composition of this invention is applied as a fertilizer. For example, assuming that the composition is applied to the soil at a rate of 200 pounds per acre and that it contains 0.05% NBPT and 0.5% DCD, it can be readily calculated that the rates of NBPT and DCD application are 0.1 and 1.0 pounds per acre, respectively.

The present invention can also comprise a nitrification inhibitor and non-UFP particles as disclosed in U.S. Publication No. 2015/052960, herein incorporated by reference for examples of non-UFP particle carriers and methods of depositing nitrification inhibitors onto the non-UFP particle carriers. Non-UFP particles can include inorganic salts, including ammonium salts, grain flour, diatomaceous earth, natural clay, and elemental sulfur. Non-limiting examples of inorganic salts, such as sulfates, include copper sulfate, iron sulfate, magnesium sulfate, hydrated calcium sulfate (gypsum), aluminum sulfate and silicon sulfate. Non-limiting examples of grain flours include corn, rice, wheat, barley, sorghum, millet, oat, triticale, rye, buckwheat, fonio, and quinoa. Non-limiting examples of natural clays include tonsteins, bentonites, including sodium bentonite, calcium bentonite, potassium bentonite, and aluminum bentonite, kaolinites, and montmorillonites. Diatomaceous earth is a mineral mostly comprised of silicon dioxides. Non-limiting examples of diatomaceous earth include Celaton MN84 (containing $SiO_2$, $Al_2O_3$, $Fe_2O_3$, CaO, and MgO and other oxides), Tripolite, Perlite, Zeolite, and Celite.

The nitrification inhibitor and non-UFP particle compositions can be prepared using any method described above for the UFP compositions. For example, the nitrification inhibitors are deposited onto the non-UFP particles by using a blending or drying device such as a high-shear mixer, ribbon blender, blade mixer, or other similar device. While heat need not be applied during blending, in one group of embodiments, the drying device is a ribbon blender or blade blender. In other embodiments, the composition is blended in standard blending equipment without drying equipment.

Typically, one or more nitrification inhibitors are coated onto or mixed with the non-UFP particle by introducing into the drying or blending device the non-UFP particles and a solution comprising a solvent and the one or more nitrification inhibitors. In one or more embodiments, the solvent can include one or more of: NMP, polyethylene glycol, THF, propylene glycol, ethylene glycol, Solketal, glycerol, glycol derivatives, ethyl acetate, dibasic esters, triethanolamine, alkanolamines, methylene chloride, solvent naptha, xylenes (including o-, m-, and p-xylenes), benzene, toluene, DMSO, and other sulfoxide derivatives, dibasic ester derivatives, acetone, glycol ethers, polyalkyleneglycol ethers, benzyl alcohol, propylene carbonate, ethylene carbonate, dioxane, hexanes, and heptane. Another embodiment is to blend the non-UFP particles with the nitrification inhibitors without solvent present. In another embodiment, nitrification inhibitor is directly sprayed onto the non-UFP particles while mixing. The mixture is then subsequently dried at an elevated temperature.

The following examples are intended to illustrate, but not to limit, the methods and compositions of the invention. All percentages described herein are by weight, unless otherwise indicated.

EXAMPLE 1

Spray-Dried Substantially Spherical UFP Particles

A urea-formaldehyde (UF) dispersion, suitable for producing substantially spherical UFP particles used in the present invention, is prepared as follows. Water (32.3 parts by weight) and a 50% aqueous solution of formaldehyde (31.8 parts by weight) were added to a reaction vessel equipped with vacuum reflux, a heater and a mixer. While adjusting the temperature of the agitated aqueous mixture to 100° F., its pH is also adjusted to about 7.0 (6.8 to 7.2) using either 50% caustic (NaOH), or 35% sulfuric acid, as needed. Once the aqueous mixture was heated to 100° F. (about 38° C.), 31.8 parts by weight of prilled urea also was added, and mixing was continued. The temperature of the agitated aqueous mixture then was increased to 120° F. (about 50° C.) and held for a time sufficient to dissolve the urea (usually about 15 minutes). While maintaining the temperature of the agitated mixture at 120° F. (about 50° C.), the pH is adjusted to within the range of 8.0 to 8.4, again using either 50% caustic (NaOH), or 35% sulfuric acid as needed. Using, as appropriate, a combination of the reaction exotherm and external heating, the reaction mixture was heated to a temperature of 158° F. and the temperature is controlled using vacuum reflux. The pH of the mixture was adjusted, as needed, to about 7.8 to 8.2, using either 50% caustic (NaOH), or 35% sulfuric acid. The agitated mixture was held at a temperature of about 158° F. (70° C.) for about 30 minutes and the pH was adjusted, as needed, to about 7.8 to 8.2, using either 50% caustic (NaOH), or 35% sulfuric acid so that the reactants formed methylol ureas. While continuing agitation, the aqueous mixture was cooled to about 105° F. (about 40° C.) and a dispersant (one part by weight of DAXAD 19) was added while the batch was cooled. Upon reaching 105° F. (about 40° C.), the batch was placed under full vacuum. While maintaining full vacuum and applying cooling to the agitated batch, the pH of the aqueous mixture was adjusted, as quickly as possible, to a pH of about 3.3 to 3.5, using 35% sulfuric acid, at which point the batch may exotherm to a temperature of above 175° F. (about 80° C.) before the exotherm subsides. This procedure caused rapid condensation of the methylol ureas to a solid network polymer. After completing the pH adjustment, the temperature of the aqueous mixture was cooled to 105° F. (about 40° C.) as quickly as possible while it was held for 20 minutes. Following the 20 minute holding period, the pH of the aqueous mixture was adjusted to 6.5 to 7.5, using either 50% caustic (NaOH), or 35% sulfuric acid, as needed, and then was discharged to storage. The UFP dispersion at about 38 weight percent solids was agitated during its storage.

The dispersion above can then be spray-dried to produce UF polymer particles. A Niro P6 spray dryer can be fed with 15 pounds per hour of the dispersion of Example 1. The spray dryer receives an inlet gas stream at a flow rate of about 415 standard cubic feet per minute and a temperature of 330-340° F. (165-170° C.). The outlet temperature of the spray dryer was measured as 75-95° F. (25-35° C.). The recovered UF polymer particle product (at about 1 wt. % moisture) had particle diameter distributed from 10 to 80 microns, with a number average diameter of 30 microns.

Alternative Example 1

Spray-Dried UFP

Using a Niro industrial-sized spray dryer (ON 030-5051), a UF polymer dispersion made in accordance with Example 1 having about a 38 wt. % solids content, at a temperature of 28° C. and at a feed rate of 100 lbs/minute was spray-dried with the atomizer wheel operating at 13,000 RPMs. Air, at a flow rate of 49,400 standard cubic feet per minute and at a temperature of 186° C. was delivered to the spray dryer. The outlet air temperature was measured as 88° C. Spray-dried UF polymer particles were recovered from the spray dryer.

Alternative Example 2

Spray-Dried UFP

A UF polymer dispersion made in accordance with Example 1 using 45.27 wt. % water 25.7 wt. % UFC 85. While adjusting the temperature of the agitated aqueous mixture to about 30° C., its pH is also adjusted from about 6.7 to 7.3 using either 50% caustic (NaOH), or 35% sulfuric acid, as needed. Once the aqueous mixture was heated to about 30° C., 24.423 wt. % prilled urea also was added and mixing was continued. The temperature of the agitated aqueous mixture then was increased to about 50° C. and held for a time sufficient to dissolve the urea (usually about 15 minutes). While maintaining the temperature of the agitated mixture at about 50° C., the pH is adjusted to within the range of 8.0 to 9.0, again using either 50% caustic (NaOH), or 35% sulfuric acid as needed. Using, as appropriate, a combination of the reaction exotherm and external heating, the reaction mixture was heated to a temperature of about 70° C. and the temperature is controlled using vacuum reflux. The pH of the mixture was adjusted, as needed, to about 7.8 to 8.2, using either 50% caustic (NaOH), or 35% sulfuric acid. The agitated mixture was held at a temperature of about 70° C. for about 30 minutes and the pH was adjusted, as needed, to about 7.8 to 8.2, using either 50% caustic (NaOH), or 35% sulfuric acid so that the reactants formed methylol ureas. While continuing agitation, the aqueous mixture was cooled to about 40° C., and a dispersant (one part by weight of DAXAD 19) was added while the batch was cooled. Upon reaching about 40° C., the batch was placed under full vacuum. While maintaining full vacuum and applying cooling to the agitated batch, the pH of the aqueous mixture was adjusted, as quickly as possible, to a pH of about 3.1 to 3.5, 20% ammonium sulfate, at which point the batch may exotherm to a temperature of above about 80° C. before the exotherm subsides. This procedure caused rapid condensation of the methylol ureas to a solid network polymer. After completing the pH adjustment, the temperature of the aqueous mixture was cooled to about 40° C. as quickly as possible while it was held for 20 minutes. Following the 20 minute holding period, the pH of the aqueous mixture was adjusted to 6.5 to 7.5, using 20% ammonium sulfate, as needed, and then was discharged to storage. The UFP dispersion at about 38 weight percent solids was agitated during its storage. This material was spray-dried as above.

EXAMPLES 3-12

NITAMIN® 36S Fertilizer With NBPT and Nitrapyrin Without Mineral Oil

Blends of NBPT (recrystallized or not recrystallized), Nitrapyrin, NITAMIN® 36S fertilizer, and green pigment were made. The Nitrapyrin and NBPT were sieved through a Tyler mesh size 14 screen prior to formulation. To a 16 oz jar with a screw-on lid was added the NITAMIN® 36S fertilizer, nitrification inhibitor, optional urease inhibitor, and the green pigment. The lid was then screwed on, and the jar was shaken for 2 minutes or until the dry mixture was homogeneous as indicated by the green pigment. Any clumps of NBPT and Nitrapyrin that were not incorporated into the NITAMIN® 36S fertilizer were optionally removed from the final product via screening or broken up and reblended. The amount of NBPT, Nitrapyrin and pigment in each formulation is shown in the table below:

|  | Ex 3 | Ex 4 | Ex 5 | Ex 6 | Ex 7 |
| --- | --- | --- | --- | --- | --- |
| NBPT | 36.8% | 30.4% | 26.0% | 22.6% | 20.0% |
| Nitrapyrin | 61.3% | 50.7% | 43.3% | 37.7% | 33.4% |
| NITAMIN ® 36S fertilizer | 0.0% | 16.9% | 28.8% | 37.7% | 44.6% |
| Pigment | 1.9% | 2.0% | 1.9% | 2.0% | 2.0% |
| Total | 100.0% | 100.0% | 100.0% | 100.0% | 100.0% |

-continued

|  | Ex 8 | Ex 9 | Ex 10 | Ex 11 | Ex 12 |
| --- | --- | --- | --- | --- | --- |
| NBPT | 22.6% | 20.1% | 18.0% | 16.3% | 15.0% |
| Nitrapyrin | 75.4% | 66.8% | 60.0% | 54.5% | 49.9% |
| NITAMIN ® 36S fertilizer | 0.0% | 11.1% | 20.0% | 27.2% | 33.2% |
| Pigment | 2.0% | 2.0% | 2.0% | 2.0% | 1.9% |
| Total | 100.0% | 100.0% | 100.0% | 100.0% | 100.0% |

EXAMPLES 3-12

Amounts Used

| Example | lb | Substance | g | 100 g Scale |
| --- | --- | --- | --- | --- |
| 3 | 1.8 | NBPT | 816.4656 | 36.8 |
|  | 3 | Nitrapyrin | 1360.776 | 61.3 |
|  | 0 | Carrier | 0 | 0.0 |
|  | 0.096 | Pigment | 43.54483 | 2.0 |
| 4 | 1.8 | NBPT | 816.4656 | 30.4 |
|  | 3 | Nitrapyrin | 1360.776 | 50.7 |
|  | 1 | Carrier | 453.592 | 16.9 |
|  | 0.116 | Pigment | 52.61667 | 2.0 |
| 5 | 1.8 | NBPT | 816.4656 | 26.0 |
|  | 3 | Nitrapyrin | 1360.776 | 43.3 |
|  | 2 | Carrier | 907.184 | 28.8 |
|  | 0.136 | Pigment | 61.68851 | 2.0 |
| 6 | 1.8 | NBPT | 816.4656 | 22.6 |
|  | 3 | Nitrapyrin | 1360.776 | 37.7 |
|  | 3 | Carrier | 1360.776 | 37.7 |
|  | 0.156 | Pigment | 70.76035 | 2.0 |
| 7 | 1.8 | NBPT | 816.4656 | 20.1 |
|  | 3 | Nitrapyrin | 1360.776 | 33.4 |
|  | 4 | Carrier | 1814.368 | 44.6 |
|  | 0.176 | Pigment | 79.83219 | 2.0 |
| 8 | 1.8 | NBPT | 816.4656 | 22.6 |
|  | 6 | Nitrapyrin | 2721.552 | 75.4 |
|  | 0 | Carrier | 0 | 0.0 |
|  | 0.156 | Pigment | 70.76035 | 2.0 |
| 9 | 1.8 | NBPT | 816.4656 | 20.1 |
|  | 6 | Nitrapyrin | 2721.552 | 66.8 |
|  | 1 | Carrier | 453.592 | 11.1 |
|  | 0.176 | Pigment | 79.83219 | 2.0 |
| 10 | 1.8 | NBPT | 816.4656 | 18.0 |
|  | 6 | Nitrapyrin | 2721.552 | 60.0 |
|  | 2 | Carrier | 907.184 | 20.0 |
|  | 0.196 | Pigment | 88.90403 | 2.0 |
| 11 | 1.8 | NBPT | 816.4656 | 16.3 |
|  | 6 | Nitrapyrin | 2721.552 | 54.5 |
|  | 3 | Carrier | 1360.776 | 27.2 |
|  | 0.216 | Pigment | 97.97587 | 2.0 |
| 12 | 1.8 | NBPT | 816.4656 | 15.0 |
|  | 6 | Nitrapyrin | 2721.552 | 49.9 |
|  | 4 | Carrier | 1814.368 | 33.2 |
|  | 0.236 | Pigment | 107.0477 | 2.0 |

EXAMPLES 13-16

NITAMIN® 36S Fertilizer With Nitrapyrin Without NBPT or Mineral Oil

Blends of Nitrapyrin, NITAMIN® 36S fertilizer, and green pigment were made. The blends were made in a 1 cubic foot ribbon blender (KAS) which ran at approximately 16 rpm. Any clumps of Nitrapyrin that were not incorporated into the NITAMIN® 36S fertilizer were optionally removed from the final product via screening or were broken up and reblended. The amount of Nitrapyrin and pigment in each formulation is shown in the table below:

|  | Ex 13 | Ex 14 | Ex 15 | Ex 16 |
| --- | --- | --- | --- | --- |
| Nitrapyrin | 90% | 80% | 70% | 60% |
| NITAMIN ® 36S fertilizer | 8% | 18% | 28% | 38% |
| Pigment | 2% | 2% | 2% | 2% |
| Total | 100.0% | 100.0% | 100.0% | 100.0% |

EXAMPLES 13-16

Amounts Used

| Example | % | Substance | 100 g Scale |
| --- | --- | --- | --- |
| 13 | 80 | Nitrapyrin | 80 |
|  | 18 | NITAMIN ® 36S fertilizer | 18 |
|  | 1.96 | Pigment | 2 |
|  | 99.96 |  |  |
| 14 | 70 | Nitrapyrin | 70 |
|  | 28 | NITAMIN ® 36S fertilizer | 28 |
|  | 1.96 | Pigment | 2 |
|  | 99.96 |  |  |
| 15 | 60 | Nitrapyrin | 60 |
|  | 38 | NITAMIN ® 36S fertilizer | 38 |
|  | 1.96 | Pigment | 2 |
|  | 99.96 |  |  |
| 16 | 90 | Nitrapyrin | 90 |
|  | 8 | NITAMIN ® 36S fertilizer | 8 |
|  | 1.96 | Pigment | 2 |
|  | 99.96 |  |  |

Examples 17 and 18

Comparative Examples With DCD

A blend of DCD, NITAMIN® 36S fertilizer and pigment were made as in EXAMPLE 3, using the formulations in the table below:

|  | Ex 17 | Ex 18 |
| --- | --- | --- |
| DCD | 98% | 80% |
| NITAMIN ® 36S fertilizer | 0% | 18% |
| Pigment | 2% | 2% |
| Total | 100.0% | 100.0% |

EXAMPLES 17-18

Amounts Used

| Example | % | Substance | 100 g Scale |
| --- | --- | --- | --- |
| 17 | 80 | DCD | 80 |
|  | 18 | NITAMIN ® 36S fertilizer | 18 |
|  | 1.96 | Pigment | 2 |
|  | 99.96 |  |  |
| 18 | 98 | DCD | 98 |
|  | 1.96 | Pigment | 2 |
|  | 99.96 |  |  |

EXAMPLE 19

Nitamin® 36S Fertilizer with DMPP

Blends of DMPP, NITAMIN® 36S fertilizer, and pigment were made. DMPP (50 g, prescreened through a Tyler size 14 mesh screen), NITAMIN® 36S fertilizer (16.7 g) and green pigment (1.3 g) were added to an 8 oz jar with a screw-on lid. The jar was sealed and shaken for 2 minutes. The material was homogenous as indicated by the green pigment. Any clumps of DMPP that were not incorporated into the NITAMIN® 36S fertilizer were optionally removed from the final product via screening or broken up and reblended. The amount of DMPP and pigment in each formulation is shown in the table below:

|  | Ex 19 |
| --- | --- |
| DMPP | 73.5% |
| NITAMIN ® 36S fertilizer | 24.6% |
| Pigment | 1.9% |
| Total | 100.0% |

EXAMPLES 20-40

Granular Urea Formulation with Formulation of Examples 3-19

This example illustrates the incorporation of the composition of Examples 3-19 into a homogenous urea-based granular fertilizer composition. Granulated urea is treated with the amounts of the solid compositions of Example 3-19 shown in the tables below. The compositions of Examples 3-19 and urea were mixed in a 16 oz jar with a screw on lid to which was added 100 g urea and the appropriate amount of dry inhibitor mixture. The lid was then screwed on, and the jar was gently rolled and shaken for 2 minutes. The fertilizer mixtures were observed to flow freely. The treated urea was sieved through a Tyler size 28 mesh screen and then weighed to determine the percent coverage. The urea-based fertilizer can be used directly or stored.

|  | Material's Source | Amt Used | % Coating |
| --- | --- | --- | --- |
| Target 1500 ppm of NI, Sample |  |  |  |
| 0 | EX 3 | 0.48 g | 53.3 |
| EX 21 | EX 4 | 0.579 g | 57.0 |
| EX 22 | EX 5 | 0.678 g | 56.0 |
| EX 23 | EX 6 | 0.781 g | 56.3 |
| EX 24 | EX 7 | 0.88 g | 20.5 |
| Target 3000 ppm of NI, Sample |  |  |  |
| EX 25 | EX 8 | 0.78 g | 12.8 |
| EX 26 | EX 9 | 0.88 g | 75.0 |
| EX 27 | EX 10 | 0.981 g | 69.3 |

-continued

|  | Material's Source | Amt Used | % Coating |
|---|---|---|---|
| EX 28 | EX 11 | 1.08 g | 63.9 |
| EX 29 | EX 12 | 1.18 g | 38.1 |
| Target 1500 ppm of NI, Sample | | | |
| EX 30 | EX 13 | 0.33 g | 72.7 |
| EX 31 | EX 14 | 0.381 g | 63.0 |
| EX 32 | EX 15 | 0.431 g | 58.0 |
| EX 33 | EX 16 | 0.50 g | 70.0 |
| Target 3000 ppm of NI, Sample | | | |
| EX 34 | EX 13 | 0.67 g | 74.6 |
| EX 35 | EX 14 | 0.75 g | 77.3 |
| EX 36 | EX 15 | 0.86 g | 65.1 |
| *EX 37 | EX 16 | 1.003 g | 61.8 |
| Target 9000 ppm of NI, Sample | | | |
| EX 38 | EX 17 | 1.842 g | 49.9 |
| EX 39 | EX 18 | 2.252 g | 39.1 |
| Target 3000 ppm of NI, Sample | | | |
| EX 40 | EX. 19 | 0.40 | 69.0 |

As can be seen from EXAMPLE 39, the maximum amount of DCD that can applied to granular urea using UFP as a carrier translates to less than 10 pounds of DCD per ton of urea. Because DCD is only effective at 2-3 pounds/acre, one needs to be able to apply 12-18 pounds of DCD/ton of urea. Accordingly, DCD's effective application rate is too high to be effectively used in the dry application formulations of the present invention for granular urea. In contrast, the other nitrification inhibitors tested have the following application rates that translate to the coating amounts in column 3:

| Substance | Lb/acre | ppm/g urea |
|---|---|---|
| dicyandiamide | 2-3 | 5964-8920 |
| 2-chloro-6-trichloromethylpyridine | 0.37 | 1110 |
| 3-methylpyrazole* | 0.12 | 360 |
| 1,2,4-triazole* | 0.24 | 719 |
| 3,4-dimethylpyrazole phosphate | 1.2 | 3587 |

*The 3-methylpyrazole and 1,2,4-triazole were applied as a combined product.

The amounts used were calculated from the recommended application concentrations indicated on the manufacturer's label for the relevant nitrification inhibitor or in the corresponding Material Safety Data Sheet. The amount used for DMPP was calculated from an application concentration of 0.8% by weight. The method of calculation for these amounts is well-known to those of skill in the art.

Accordingly, Examples 13-40 show that the dry formulations of the present invention would be effective in commercial applications.

Although the foregoing invention has been described in some detail by way of illustration and example for purposes of clarity of understanding, one of skill in the art will appreciate that certain changes and modifications may be practiced within the scope of the appended claims. In addition, each reference provided herein is incorporated by reference in its entirety to the same extent as if each reference was individually incorporated by reference. Where a conflict exists between the instant application and a reference provided herein, the instant application shall dominate.

The invention claimed is:
1. A composition comprising components:
(a) a nitrification inhibitor selected from the group consisting of 2-chloro-6-trichloromethylpyridine (nitrapyrin), 3,4-dimethylpyrazole phosphate (DMPP), 3-methylpyrazole (MP); 1-H-1,2,4-triazole (TZ); 3-methylpyrazole-1-carboxamide (CMP); 4-amino-1,2,4-triazole (AT, ATC); 3-amino-1,2,4-triazole; 2-cyanimino-4-hydroxy-6-methylpyrimidine (CP); 2-ethylpyridine; ammonium thiosulfate (ATS); sodium thiosulfate (ST); thiophosphoryl triamide; thiourea (TU); guanylthiourea (GTU); ammonium polycarboxilate; ethylene urea; hydroquinone; 10 phenylacetylene; phenylphosphoro diamidate; neemcake; calcium carbide; 5-ethoxy-3-trichloromethyl-1,2,4-thiadiazol (etridiazol; terraole); 2-amino-4-chloro-6-methylpyrimidine (AM); 1-mercapto-1,2,4-triazole (MT); 2-mercaptobenzothiazole (MBT); 2-sulfanilamidothiazole (ST); 5-amino-1,2,4-thiadiazole; 2,4-diamino-6-trichloromethyl-s-triazine (CL-1580); N-2,5-dichlorophenyl succinanilic acid (DCS); nitroaniline, chloroaniline, and salts thereof; and
(b) urea-formaldehyde polymer (UFP) particles;
wherein the composition comprises about 30% by weight to about 95% by weight of the nitrification inhibitor.
2. The composition of claim 1, wherein the nitrification inhibitor is dimethylpyrazole phosphate (DMPP).
3. The composition of claim 1, wherein the nitrification inhibitor is nitrapyrin.
4. The composition of claim 3, further comprising a urease inhibitor.
5. The composition of claim 4, wherein the urease inhibitor is N-(n-butyl)thiophosphoric triamide (NBPT).
6. The composition of claim 4, wherein composition comprises about 15% by weight to about 40% by weight of the urease inhibitor, about 15% by weight to about 50% by weight of the UFP particles, and about 40% by weight to about 95% by weight of the nitrification inhibitor, based on the total weight of the composition.
7. The composition of claim 1, further comprising one or more components selected from the group consisting of a conditioner, a pigment, and a dye.
8. A composition according to claim 7, wherein the composition comprises a conditioner selected from the group consisting of mineral oil, tricalcium phosphate, sodium bicarbonate, sodium ferricyanide, potassium ferricyanide, bone phosphate, sodium silicate, silicon dioxide, calcium silicate, talcum powder, bentonite, calcium aluminum silicate, stearic acid, sodium aluminosilicate, and polyacrylate powder.
9. A composition of claim 1, wherein at least one of the following conditions is met:
a majority of the UFP particles have a particle diameter in the range of about 150 μm to about 10 μm;
the UFP particles have an average diameter of about 0.05 microns to about 250 microns;
the UFP particles have an average diameter of about 0.1 microns to about 150 microns;
at least a portion of the UFP particles have an average diameter of about 0.01 microns to about 50 microns;
about 0.1% to about 50% by weight of the UFP particles have an average diameter of about 0.05 microns to about 5 microns;
about 5% to about 99% by weight of the UFP particles have an average diameter of about 10 microns to about 150 microns;
about 0.1% by weight to about 40% by weight of the UFP particles have an average diameter that is up to a threshold value, and about 50% by weight to about 99% by weight of the particles have an average diameter that is greater than the threshold value, said threshold value being 0.5 microns, 1 micron, 2 microns, 5 microns, or 10 microns.

10. The composition of claim 9, wherein the UFP particles are substantially spherical.

11. The composition of claim 10, wherein the substantially spherical UFP particles are made by acidifying an aqueous methylol urea solution, wherein the aqueous methylol urea solution is made by reacting urea and formaldehyde at a urea:formaldehyde mole ratio of from 0.7:1 to 1.25:1, and wherein the aqueous methylol urea solution contains a dispersing agent, is subjected to a high shear condition during the acidifying, or both contains a dispersing agent and is subjected to a high shear condition during the acidifying, to form an aqueous dispersion of insoluble urea formaldehyde polymer particles and drying the dispersion to recover the urea-formaldehyde polymer particles.

12. The composition of claim 1, wherein the composition is made by a process comprising contacting the UFP particles with a solution of said nitrification inhibitor in a solvent under conditions including elevated temperatures and sub-atmospheric pressures thereby forming said composition.

13. The composition of claim 12, wherein the solvent is selected from the group consisting of NMP, polyethylene glycol, THP, propylene glycol, ethylene glycol, Solketal, glycerol, glycol derivatives, ethyl acetate dibasic esters, triethanolamine, alkanolamines, methylene chloride, solvent naptha, xylenes, benzene, toluene, DMSO, and other sulfoxide derivatives, dibasic ester derivatives, acetone, glycol ethers, polyalkyleneglycol ethers, benzyl alcohol, propylene carbonate, ethylene carbonate, dioxane, hexanes, heptane, and combinations thereof.

14. The composition of claim 1, comprising about 30% by weight to about 95% by weight of the nitrification inhibitor and about 5% by weight to about 70% by weight of the UFP particles based on the total weight of the composition.

15. A fertilizer comprising urea and the composition of claim 1
wherein said urea is present in an amount of about 90% by weight to about 99% by weight and the content of said nitrification inhibitor and said UFP particles is present in an amount of about 0.02% by weight to about 0.5% by weight.

16. The fertilizer of claim 15, wherein the fertilizer is in a granule, a prill, a pellet, a pastille, or a compounded form.

17. The fertilizer of claim 16, wherein the fertilizer is a granule having a diameter of about 0.8 mm to about 4.8 mm.

18. The fertilizer of claim 15, wherein the composition further comprises a urease inhibitor.

19. The fertilizer of claim 15, wherein the composition further comprises one or more components selected from the group consisting of a conditioner, a pigment, and a dye.

20. The composition of claim 3, further comprising one or more components selected from the group consisting of a conditioner, a pigment, and a dye.

21. The composition of claim 4, further comprising one or more components selected from the group consisting of a conditioner, a pigment, and a dye.

22. The composition of claim 6, further comprising one or more components selected from the group consisting of a conditioner, a pigment, and a dye.

23. The composition of claim 1, wherein the UFP particles are substantially spherical.

* * * * *